United States Patent Office 3,139,461
Patented June 30, 1964

3,139,461
METHOD OF PREPARING POLYNITROALKANES
Milton B. Frankel, Menlo Park, and Karl Klager, Sacramento, Calif., assignors to Aerojet-General Corporation, Azusa, Calif., a corporation of Ohio
No Drawing. Filed Apr. 9, 1962, Ser. No. 186,274
7 Claims. (Cl. 260—644)

This invention relates to a new method of preparing polynitroalkane compounds. In particular, the invention relates to the preparation of polynitroalkanes having the structural formula:

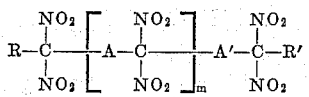

wherein R and R' are the same or different lower alkyl radicals; i.e., those radicals containing from 1 to about 8 carbon atoms, such as methyl, propyl, t-butyl, pentyl, octyl. A and A' are the same or different alkylene radicals, such as methylene, pentamethylene, etc. The lower alkylene groups are preferred, especially those of from 1 to about 8 carbon atoms. The groups R, R', A and A' may be branched or straight chain. In the above formula, $m$ is a whole number selected from the group consisting of 1 and 2.

The polynitroalkanes of the above formula are useful as explosives and have been previously prepared by the nitration of the corresponding enolacetate. This method is both complicated and tedious. Moreover, this method is unsatisfactory for large scale production of the polynitroalkanes.

One object of this invention is to prepare polynitroalkane compositions by a method that can be practiced on a large scale. Another object is to employ a strong nitrating agent to provide a more convenient method of obtaining the polynitroalkanes. These and other objects will appear hereinafter.

The novel method of our invention contemplates the preparation of nitroalkane compositions through the use of nitrating agents. The nitroalkanes are prepared by reacting an alkali salt having a structural formula:

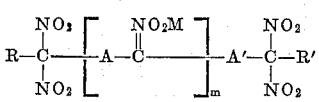

wherein R, R', A, A' and $m$ are as defined above, and M is an alkali metal such as lithium, sodium or potassium, with a strong nitrating agent; i.e., a compound capable of furnishing nitronium ions. The choice of the nitrating agent is not critical. Any of the common, strong nitrating agents, such as nitric acid, nitrogen tetroxide, and mixtures of nitric acid with acetic anhydride, trifluoroacetic anhydride, or concentrated sulfuric acid may be used.

We have learned that in most cases higher yields and better purity are obtained when nitrogen tetroxide is used as the nitrating agent.

A preferred temperature range in the practice of our invention is from about −20° C. to about +20° C., although the reaction will operate at temperatures outside of this range.

A preferred concentration where nitric acid is used as the nitrating agent is from about 60% to about 80% nitric acid solution. More preferred is a 70% nitric acid solution since it is the most readily available.

Generally speaking, a solvent is not required to practice our invention. However, we prefer to use a solvent when nitrogen tetroxide is used as the nitrating agent. Any essentially inert solvent can be used although carbon tetrachloride is preferred.

Pressure is not critical in these reactions; therefore, while any pressure can be used, the reaction is normally run under atmospheric pressure. However, when nitrating at elevated temperatures with a readily gasified nitrating agent such as nitrogen tetroxide, it is desirable to carry out the reaction at elevated pressure. Agitation of the reactants, such as by mechanical stirrer, is not required although it is helpful in initiating the reaction. The polynitroalkanes of this invention are normally solids and may be isolated in conventional manner by filtration, evaporation, and/or crystallization.

While the alkali salt and the nitrating agent may be employed in any proportions, it is advantageous to use an excess of the nitrating agent so as to drive the reaction to completion.

The following examples are presented to more clearly illustrate our invention. In the examples, the percentages are by weight unless otherwise indicated. It should be understood, however, that these examples are presented purely for purposes of illustration and that the invention is not limited except as indicated by the claims appended hereto.

EXAMPLE I

The Preparation of 2,2,4,4,6,6-Hexanitroheptane Using 70% Nitric Acid

Fifty ml. of 70% nitric acid was placed in a 200-ml. 3-necked flask, fitted with a mechanical stirrer and thermometer. The acid was cooled to 5° C., and 10.0 g. of the potassium salt of 2,2,4,6,6-pentanitroheptane, M.P. 110° C. (this compound may be prepared by neutralizing 2,2,4,6,6-pentanitroheptane with potassium hydroxide), was added. The reaction mixture was allowed to warm slowly to room temperature (1 to 2 hours) and then stirred at room temperature (1 to 2 hours). An additional 25 ml. of 70% nitric acid was added and the mixture was heated to 80° C. to give a clear solution. The solution was cooled and poured on ice and the white solid was collected, washed with water, and dried. Three recrystallizations from 70° nitric acid yielded 4.3 g. of 2,2,4,4,6,6-hexanitroheptane having a melting point of 132 to 133° C.

Analysis.—Calc'd for $C_7H_{10}N_6O_{12}$: C, 22.71%; H, 2.72%; N, 22.70%. Found: C, 22.53%; H, 2.68%; N, 22.57%.

EXAMPLE II

The Preparation of 2,2,4,4,6,6-Hexanitroheptane With Nitrogen Tetroxide

A solution of 20 ml. of nitrogen tetroxide and 50 ml. of dry carbon tetrachloride was placed in a 200-ml. 3-necked flask fitted with a mechanical stirrer and thermometer. The solution was cooled to −20° C. and 10.0 grams of potassium salt of pentanitroheptane was added proportionwise. The reaction mixture was stirred at −15 to −25° C. for four hours. The white solid was collected, washed with water and dried in vacuo over potassium hydroxide. The white solid 2,2,4,4,6,6-hexanitroheptane obtained was recrystallized from a minimum amount of 70% nitric acid. The product weighed 4.42 grams (43.3%).

Other compositions having similar structures can also be prepared according to our invention.

Potassium, 3,3,5,7,7-pentanitrononane
Dilithium 2,2,4,6,8,8-hexanitrononane
Potassium 2,2,4,7,7-pentanitrooctane are easily nitrated with a strong nitrating agent, according to our invention to yield 3,3,5,5,7,7-hexanitrononane
2,2,4,4,6,6,8,8-octanitrononane
2,2,4,4,7,7-hexanitrooctane respectively. Those skilled in the art will readily appreciate the fact that both higher and lower molecular weight compounds having a plurality of nitro substituents can be prepared according to our invention by the method described above simply by reacting appropriate starting materials.

The polynitroalkanes prepared according to the process of our invention are inherently useful as explosives. These compounds can be used in any conventional explosive missile, projectile, rocket, or the like, as the main explosive charge. These compounds are also useful as oxidizers for known propellant binders, such as the polyurethanes and nitrated polyurethanes.

It will be understood that various modifications may be made in this invention without department from the spirit thereof or the scope of the appended claims.

We claim:

1. A method of preparing compounds of the formula:

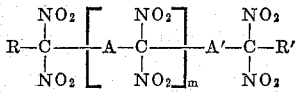

wherein R and R' are lower alkyl radicals, A and A' are lower alkylene radicals, and $m$ is a whole number selected from 1 and 2, which comprises reacting an alkali salt having the following formula:

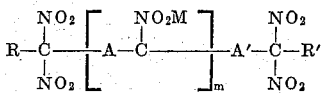

wheerin R and R' are lower alkyl radicals, A and A' are lower alkylene groups, $m$ is a whole number selected from 1 and 2, and M is an alkali metal, with a strong nitrating agent.

2. The method of claim 1 wherein the nitrating agent is nitric acid.

3. The method of claim 2 wherein the nitrating agent is 70% nitric acid.

4. The method of claim 1 wherein the reaction is carried out in the presence of an inert solvent.

5. The method of claim 1 wherein the nitrating agent is nitrogen tetroxide.

6. The method of claim 1 wherein the reaction is carried out at a temperature between about $-20°$ C. and $+20°$ C.

7. A method of preparing compounds of the formula:

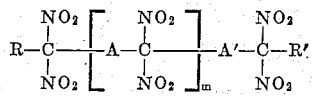

wherein R and R' are lower alkyl radicals, A and A' are lower alkylene radicals, and $m$ is a whole number selected from 1 and 2, which comprises reacting an alkali salt having the following formula:

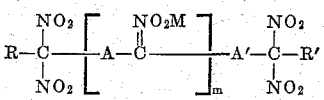

wherein R and R' are lower alkyl radicals, A and A' are lower alkylene groups, $m$ is a whole number selected from 1 and 2, and M is an alkali metal, with a strong nitrating agent at a temperature of from about $-20°$ C. to about $+20°$ C. in an inert solvent.

References Cited in the file of this patent

Topchiev: "Nitration of Hydrocarbons and Other Organic Compounds," pub. by Pergamon Press, N.Y. (1959), pp. 177 and 178 relied upon.